United States Patent
Ogiwara

(10) Patent No.: US 12,101,566 B2
(45) Date of Patent: Sep. 24, 2024

(54) INFORMATION PROCESSING APPARATUS, INFORMATION PROCESSING TERMINAL, METHOD, AND MODEL

(71) Applicant: SONY GROUP CORPORATION, Tokyo (JP)

(72) Inventor: Yasuki Ogiwara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 63 days.

(21) Appl. No.: 17/906,252

(22) PCT Filed: Mar. 31, 2020

(86) PCT No.: PCT/JP2020/014971
§ 371 (c)(1),
(2) Date: Sep. 13, 2022

(87) PCT Pub. No.: WO2021/199367
PCT Pub. Date: Oct. 7, 2021

(65) Prior Publication Data
US 2023/0128220 A1     Apr. 27, 2023

(51) Int. Cl.
*H04N 23/84* (2023.01)
*H04N 9/45* (2006.01)
(Continued)

(52) U.S. Cl.
CPC ............... *H04N 23/84* (2023.01); *H04N 9/45* (2013.01); *H04N 9/641* (2013.01); *H04N 9/646* (2013.01); *H04N 23/90* (2023.01)

(58) Field of Classification Search
CPC .......... H04N 23/84; H04N 9/45; H04N 9/641; H04N 9/646; H04N 23/90; H04N 1/6055; H04N 17/002; H04N 23/83; H04N 1/6033
See application file for complete search history.

(56) References Cited

U.S. PATENT DOCUMENTS

| 7,180,629 B1 * | 2/2007 | Nishio | H04N 23/88 358/1.9 |
| 8,223,399 B1 * | 7/2012 | Lee | H04N 1/60 358/1.9 |

(Continued)

FOREIGN PATENT DOCUMENTS

| JP | 2005-117524 A | 4/2005 |
| JP | 2006-094137 A | 4/2006 |

(Continued)

OTHER PUBLICATIONS

International Search Report and Written Opinion of PCT Application No. PCT/JP2020/014971, issued on Jun. 30, 2020, 08 pages of ISRWO.

(Continued)

*Primary Examiner* — Shahbaz Nazrul
(74) *Attorney, Agent, or Firm* — CHIP LAW GROUP

(57) ABSTRACT

Provided is an information processing apparatus including an acquisition unit that acquires a second image obtained by photographing a color sample by a second camera device and by developing, and an estimation unit that estimates a second 3D-LUT for reproducing, by the first camera device, a color of the color sample in the second image by inputting the second image to a model that has learned a first image obtained by photographing the color sample under a standard light source by a first camera device and by developing as input data and a first 3D lookup table (3D-LUT) used for developing the first image as correct answer data. As a result, the 3D-LUT can be generated more easily.

16 Claims, 9 Drawing Sheets

(51) Int. Cl.
     *H04N 9/64*     (2023.01)
     *H04N 23/90*    (2023.01)

(56) References Cited

U.S. PATENT DOCUMENTS

2015/0296193 A1   10/2015   Cote
2021/0350512 A1*  11/2021   Kadu ........................ G06T 5/40

FOREIGN PATENT DOCUMENTS

| JP | 2011-146936 A | 7/2011 |
| JP | 2014-233064 A | 12/2014 |
| JP | 2017-055231 A | 3/2017 |
| JP | 2018-152804 A | 9/2018 |

OTHER PUBLICATIONS

Vazquez-Corral Javier et al: "Color Stabilization Along Time and Across Shots of the Same Scene, for One or Several Cameras of Unknown Specifications", IEEE Transactions on Image Processing, IEEE, USA, vol. 23, No. 10, Oct. 1, 2014 (Oct. 1, 2014), pp. 4564-4575, XP011559055, ISSN: 1057-7149, DOI: 10.1109/TIP.2014.2344312.

Wang Po-Tong et al: "Colorimetric Characterization of Color Image Sensors Based on Convolutional Neural Network Modeling", Sensors and Materials., [Online] vol. 31, No. 5, May 16, 2019 (May 16, 2019), pp. 1513-1522,XP093039605, JP ISSN: 0914-4935, DOI: 10.18494/SAM.2019.2271.

* cited by examiner

INFORMATION PROCESSING APPARATUS, INFORMATION PROCESSING TERMINAL, METHOD, AND MODEL

CROSS REFERENCE TO RELATED APPLICATIONS

This application is a U.S. National Phase of International Patent Application No. PCT/JP2020/014971 filed on Mar. 31, 2020. Each of the above-referenced applications is hereby incorporated herein by reference in its entirety.

FIELD

The present disclosure relates to an information processing apparatus, an information processing terminal, a method, a program, and a model.

BACKGROUND

As performance of a camera function provided in a smartphone, a tablet personal computer (PC), or the like improves, a trend of porting a camera technology typically of a digital single-lens camera to the camera function is accelerated. Therefore, a demand for better color representation of an image photographed by the smartphone or the like has increased, and color correction by providing an advanced correction block such as a 3D lookup table (3D-LUT) in the smartphone or the like is effective means.

CITATION LIST

Patent Literature

Patent Literature 1: JP 2017 055231 A

SUMMARY

Technical Problem

However, the difficulty of designing color reproduction using a 3D lookup table (3D-LUT) is high, and an enormous work of parameter setting is required. In particular, the color representation of captured images differs due to variations in image sensors and the like even in the same model, as well as between different models, and thus, it takes an extreme long time to set 3D-LUT parameters.

Therefore, the present disclosure proposes an information processing apparatus, an information processing terminal, a method, a program, and a model capable of generating the 3D-LUT more easily.

Solution to Problem

The present disclosure proposes an information processing apparatus including, an acquisition unit configured to acquire a first image obtained by photographing a color sample under a standard light source by a first camera device and by developing, and a first 3D lookup table (3D-LUT) used for developing the first image, and a learning unit configured to perform learning of a model for generating a second 3D-LUT for reproducing, by the first camera device, a color of the color sample in a second image obtained by photographing the color sample by a second camera device and by developing, the model using the first image as input data and the first 3D-LUT as correct answer data.

The present disclosure proposes an information processing apparatus including, an acquisition unit configured to acquire a second image obtained by photographing a color sample by a second camera device and by developing, and an estimation unit configured to estimate a second 3D lookup table (3D-LUT) for reproducing, by a first camera device, a color of the color sample in the second image by inputting the second image to a model, the model using, for learning, a first image obtained by photographing the color sample under a standard light source by the first camera device and by developing as input data and a first 3D-LUT used for developing the first image as correct answer data.

The present disclosure proposes a method using an information processing apparatus to implement, acquiring a first image obtained by photographing a color sample under a standard light source by a first camera device and by developing, and a first 3D lookup table (3D-LUT) used for developing the first image, and performing learning of a model for generating a second 3D-LUT for reproducing, by the first camera device, a color of the color sample in a second image obtained by photographing the color sample by a second camera device and by developing, the model using the first image as input data and the first 3D-LUT as correct answer data.

The present disclosure proposes a method using an information processing apparatus to implement, acquiring a second image obtained by photographing a color sample by a second camera device and by developing, and estimating a second 3D lookup table (3D-LUT) for reproducing, by a first camera device, a color of the color sample in the second image by inputting the second image to a model, the model using, for learning, a first image obtained by photographing the color sample under a standard light source by the first camera device and by developing as input data and a first 3D-LUT used for developing the first image as correct answer data.

The present disclosure proposes a program causing an information processing apparatus to execute, acquiring a first image obtained by photographing a color sample under a standard light source by a first camera device and by developing, and a first 3D lookup table (3D-LUT) used for developing the first image, and performing learning of a model for generating a second 3D-LUT for reproducing, by the first camera device, a color of the color sample in a second image obtained by photographing the color sample by a second camera device and by developing, the model using the first image as input data and the first 3D-LUT as correct answer data.

The present disclosure proposes a program causing an information processing apparatus to execute, acquiring a second image obtained by photographing a color sample by a second camera device and by developing, and estimating a second 3D lookup table (3D-LUT) for reproducing, by a first camera device, a color of the color sample in the second image by inputting the second image to a model, the model using, for learning, a first image obtained by photographing the color sample under a standard light source by the first camera device and by developing as input data and a first 3D-LUT used for developing the first image as correct answer data.

The present disclosure proposes a model using, for learning, a first image obtained by photographing a color sample under a standard light source by a first camera device and by developing as input data and a first 3D lookup table (3D-LUT) used for developing the first image as correct answer data, the model including, an input layer to which a second image obtained by photographing the color sample by a second camera device and by developing is input, an output layer that outputs a second 3D-LUT for reproducing, by the first camera device, a color of the color sample in the second image, a first element that belongs to any layer from the input layer to the output layer other than the output layer, and a second element whose value is calculated based on the first element and a weight of the first element, wherein the model causes an information processing apparatus to output the second 3D-LUT from the output layer by performing an operation based on the first element and the weight of the first element, the first element being each element belonging to each layer other than the output layer according to the second image input to the input layer.

DESCRIPTION OF EMBODIMENTS

Hereinafter, the present embodiment will be detailed with reference to the drawings. Note that, in the present specification and the drawings, substantially the same parts are given the same reference signs to omit duplicate description.

The description will be given in the following order.
1. Embodiment
   1.1. Functional configuration example
   1.2. Details of functions
   1.3. Functional flow
2. Modification
   2.1. First modification
   2.2. Second modification
3. Hardware configuration example
4. Summary 1. Embodiment 1.1. Functional Configuration Example First, a functional configuration example of an information processing apparatus 100 according to the present embodiment will be described. The information processing apparatus 100 may be a server device managed by a manufacturer of smartphones or cameras, or may be a stationary terminal or a notebook personal computer (PC). Note that the information processing apparatus 100 may also be a cloud server device managed by a company that provides a cloud computing service. Furthermore, the information processing apparatus 100 does not need to be configured by one computer, and may be a distributed computing system configured by a plurality of computers.

The information processing apparatus 100 constructs a learning model by learning training data including a developed image of an image obtained by photographing a color sample under a standard light source by a first camera device as input data and a 3D lookup table (3D-LUT) used for developing the image as correct answer data. Then, the learning model is used for estimating a 3D-LUT for reproducing, by the first camera device, a color of the color sample in another image photographed by a second camera device. Note that the camera device may be a smartphone or the like equipped with a camera function, or may be a camera itself such as a digital camera.

Figure 1:
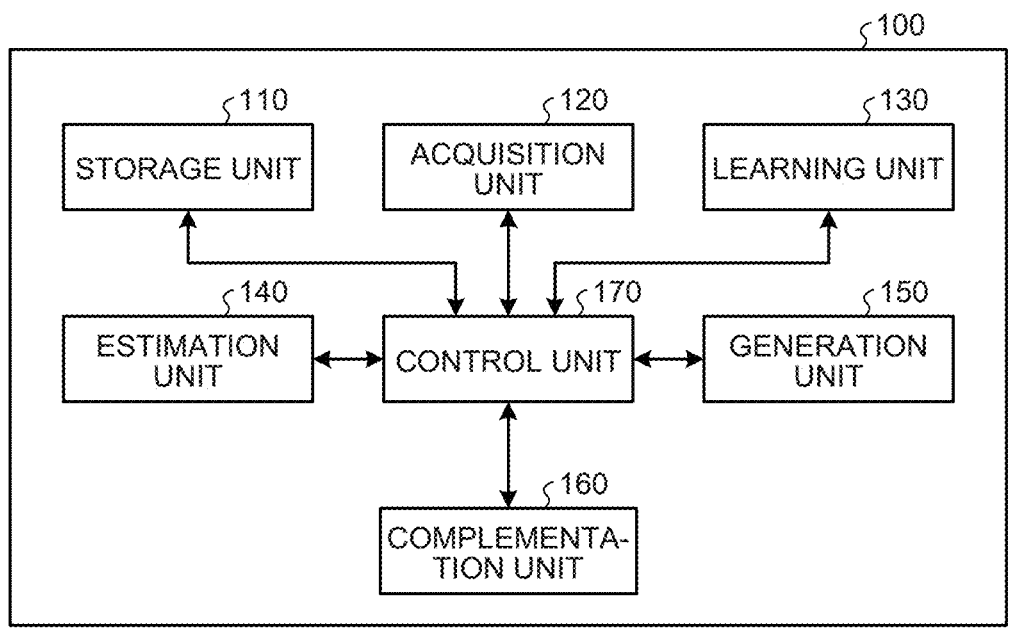
FIG. 1 is a block diagram illustrating a functional configuration example of an information processing apparatus 100 according to the present embodiment.

FIG. 1 is a block diagram illustrating a functional configuration example of the information processing apparatus 100 according to the present embodiment. As illustrated in FIG. 1, the information processing apparatus 100 according to the present embodiment includes a storage unit 110, an acquisition unit 120, a learning unit 130, an estimation unit 140, a generation unit 150, and a control unit 170.

(Storage Unit 110)

The storage unit 110 according to the present embodiment is a storage area for temporarily or permanently storing various programs and data. The storage unit 110 may store programs and data for the information processing apparatus 100 to execute various functions. As a specific example, the storage unit 110 may store the learning model (color reproduction LUT estimation model) for estimating the 3D-LUT that is used for reproducing the color of the image from the developed image obtained by photographing the color sample, the training data for learning, and management data for managing various settings. Obviously, the above is merely an example, and the type of data stored in the storage unit 110 is not particularly limited.

(Acquisition Unit 120)

In a learning phase of the color reproduction LUT estimation model, the acquisition unit 120 according to the present embodiment acquires a developed image of the image obtained by photographing the color sample (corresponding to a "first image") by a camera device (corresponding to a "first camera device") for reproducing color representation of another camera device, and the 3D-LUT used for developing the image. Furthermore, in a recognition (estimation) phase of the color reproduction LUT estimation model, the acquisition unit 120 acquires a developed image of an image obtained by photographing the color sample (corresponding to a "second image") by a camera device for which the 3D-LUT is estimated (corresponding to a "second camera device").

(Learning Unit 130)

The learning unit 130 according to the present embodiment learns the training data including the developed image of the image obtained by photographing the color sample under the standard light source (corresponding to the "first image") acquired by the acquisition unit 120 as the input data and the 3D-LUT used for developing the image (corresponding to a "first 3D-LUT") as the correct answer data to construct the color reproduction LUT estimation model.

Note that the color reproduction LUT estimation model of the present embodiment includes an input layer to which the developed image of the image obtained by photographing the color sample is input, an output layer, a first element belonging to any layer from the input layer to the output layer other than the output layer, and a second element whose value is calculated based on the first element and a weight of the first element. The color reproduction LUT estimation model causes the information processing apparatus 100 to output, from the output layer, the 3D-LUT for reproducing the color of the developed image of the image obtained by photographing the color sample by performing an operation based on the first element and the weight of the first element. The first element is each element belonging to each layer other than the output layer according to the image input to the input layer.

Note that a generation device (e.g., the information processing apparatus 100 such as a server device) that generates the learning model of the present embodiment may generate the above-described learning model using any learning algorithm. For example, the generation device may generate the learning model of the present embodiment using a learning algorithm such as a neural network (NN), a support vector machine (SVM), or reinforcement learning. As an example, it is assumed that the generation device generates the learning model of the present embodiment using the NN. In this case, the learning model may have the input layer including one or more neurons, an intermediate layer including one or more neurons, and the output layer including one or more neurons.

Here, it is assumed that the learning model according to the present embodiment is realized by a regression model indicated by "$y=a_1*x_1+a_2*x_2+ \ldots +a_i*x_i$". In this case, the first element included in the learning model corresponds to input data ($x_i$) such as $x_1$ and $x_2$. Further, the weight of the first element corresponds to coefficient $a_i$ corresponding to $x_i$. Here, the regression model can be regarded as a simple perceptron having the input layer and the output layer. When each model is regarded as the simple perceptron, the first element can be regarded as any node included in the input layer, and the second element can be regarded as a node included in the output layer.

Furthermore, it is assumed that the learning model according to the present embodiment is realized by the NN including one or more intermediate layers such as a deep neural network (DNN). In this case, the first element included in the learning model corresponds to any node included in the input layer or the intermediate layer. In addition, the second element corresponds to a node of a next stage that is a node to which a value is transmitted from the node corresponding to the first element. In addition, the weight of the first element corresponds to a connection coefficient that is a weight considered for a value transmitted from the node corresponding to the first element to the node corresponding to the second element.

The 3D-LUT for reproducing the color of the developed image of the image obtained by photographing the color sample is calculated using the learning model having an arbitrary structure such as the regression model or the NN described above. More specifically, in the learning model, a coefficient is set so as to output the 3D-LUT for reproducing the color of the image when the developed image of the image obtained by photographing the color sample is input. The learning model according to the present embodiment may be a model generated based on a result obtained by repeating input and output of data.

Note that the above example refers to an example in which the learning model according to the present embodiment is a model (referred to as model A) that outputs the 3D-LUT for reproducing the color of the image when the developed image of the image obtained by photographing the color sample is input. However, the learning model according to the present embodiment may be a model generated based on a result obtained by repeating input and output of data to and from the model A. For example, the learning model according to the present embodiment may be a learning model (referred to as model B) that outputs the 3D-LUT for reproducing the color of the image output by the model A when the developed image of the image obtained by photographing the color sample is input. Still more, the learning model according to the present embodiment may be a learning model that outputs the 3D-LUT for reproducing the color of the image output by the model B when the developed image of the image obtained by photographing the color sample is input.

(Estimation Unit 140)

The estimation unit 140 according to the present embodiment inputs the second image obtained by photographing the color sample by the second camera device to the color reproduction LUT estimation model generated by learning the first image obtained by photographing the color sample under the standard light source by the first camera device as the input data and the first 3D-LUT used for developing the first image as the correct answer data, thereby estimating a second 3D-LUT for reproducing the color of the color sample in the second image by the first camera device.

(Generation Unit 150)

The generation unit 150 according to the present embodiment generates a differential 3D-LUT for an adjusted camera device to match its color representation to that of a reference camera device based on a difference between a 3D-LUT of the reference camera device and a 3D-LUT of the adjusted camera device. In addition, the generation unit 150 changes 3D-LUT parameters under a predetermined condition to generate the training data for the color reproduction LUT estimation model.

(Complementation Unit 160)

When the number of 3D-LUT parameters (e.g., about 36000 by 33×33×33) estimated by the estimation unit 140 is smaller than the number of display colors (e.g., about 16.77 million colors by 8 bits of each color of RGB) of the camera device and there is a color that cannot be reproduced, the complementation unit 160 according to the present embodiment complements, from the estimated 3D-LUT parameters, a parameter for reproducing the color that cannot be reproduced. A complementation method may be, for example, tetrahedral complementation, polynomial approximation, DNN described above, or the like.

(Control Unit 170)

The control unit 170 according to the present embodiment is a processing unit that controls the entire information processing apparatus 100, and controls each component included in the information processing apparatus 100. Details of functions of the control unit 170 will be described later.

The functional configuration example of the information processing apparatus 100 according to the present embodiment has been described above. Note that the functional configuration described above with reference to FIG. 1 is merely an example, and the functional configuration of the information processing apparatus 100 according to the present embodiment is not limited thereto. For example, the information processing apparatus 100 may not necessarily include all of the components illustrated in FIG. 1, and in a case where learning by the learning model and estimation are performed by different apparatuses, each component such as the estimation unit 140 can be included in another apparatus different from the information processing apparatus 100. The functional configuration of the information processing apparatus 100 according to the present embodiment can be flexibly modified according to specifications and operations.

In addition, the function of each component may be performed by reading a control program from a storage medium such as a read only memory (ROM) or a random access memory (RAM) storing the control program in which a process procedure for realizing these functions is described by an arithmetic device such as a central processing unit (CPU), and interpreting and executing the program. Therefore, it is possible to appropriately change the configuration to be used according to a technical level at the time of carrying out the present embodiment. Furthermore, an example of a hardware configuration of the information processing apparatus 100 will be described later.

1.2. Details of Functions

Next, functions of the information processing apparatus 100 according to the present embodiment will be described in detail. The present embodiment is performed to estimate the 3D-LUT for reproducing, by the first camera device, the color of the image captured by the second camera device different from the first camera device by using the color reproduction LUT estimation model that has learned the image of the color sample photographed by the first camera device such as the smartphone and the 3D-LUT used for developing the image. Therefore, a main process according to the present embodiment is divided into the learning phase and the estimation phase of the color reproduction LUT estimation model. Note that both phases may be executed by the same device or may be executed by different devices.

Figure 2:
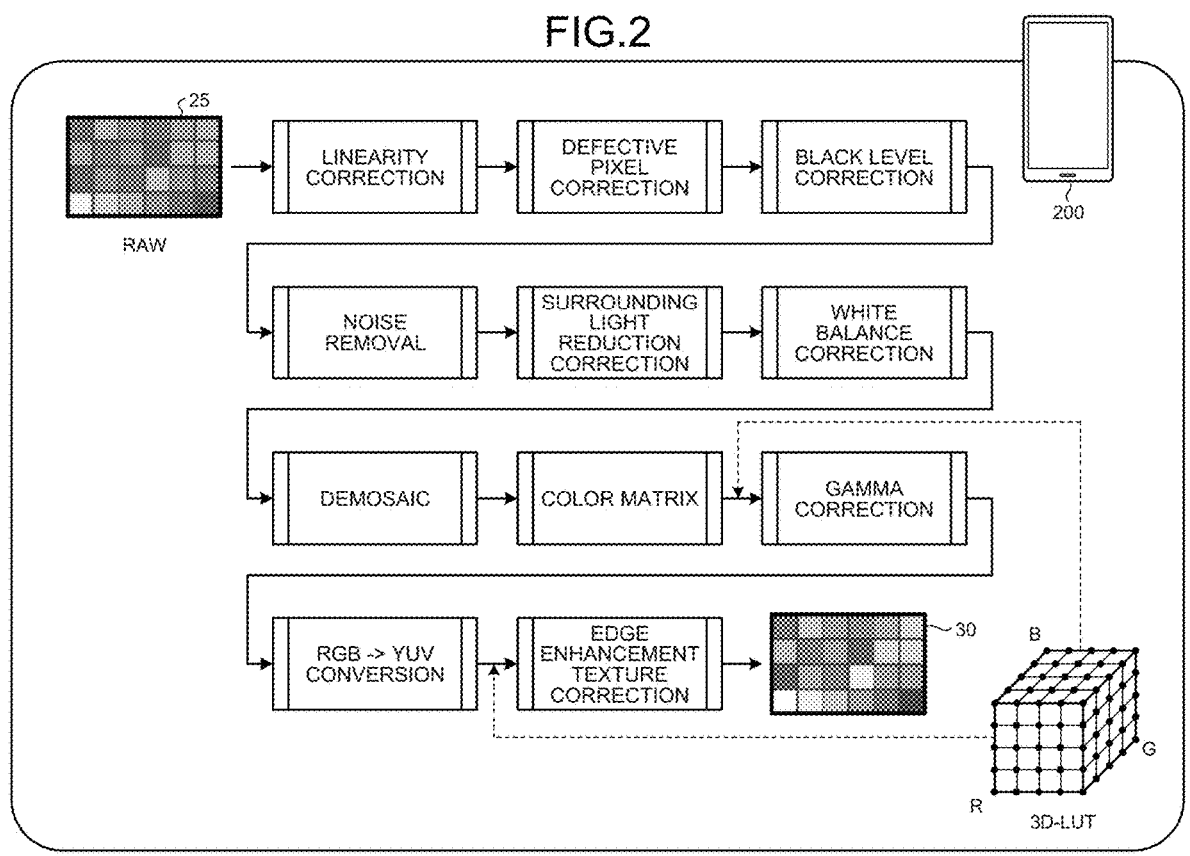
FIG. 2 is a diagram illustrating an example of general camera signal processing.

First, before describing the present embodiment, camera signal processing when a picture is taken by the camera device such as the smartphone will be described. FIG. 2 is a diagram illustrating an example of general camera signal processing. FIG. 2 illustrates various processes executed by an information processing terminal 200 such as the smartphone equipped with the camera function. The information processing terminal 200 may be a camera device such as a digital camera.

The information processing terminal 200 converts light of a subject incident through a camera lens into RAW data 25 by an image sensor. In the example in FIG. 2, RAW data 25 is image data obtained by photographing the color sample, and is signals arranged in a Bayer array by a Bayer filter. The color sample is a color chart including a plurality of colors, such as a Macbeth chart. However, the color sample may also be a chart that includes more colors than the Macbeth chart.

The RAW data 25 is adjusted through various correction processes such as linearity correction, noise removal, and light reduction correction, and then converted into full-color image data of RGB signals by demosaic and color matrix processing. Furthermore, in the example in FIG. 2, the RGB signals are further converted into YUV (or YCbCr) signals, and developed image data 30 is output.

Here, a conversion process using the 3D-LUT for adjusting the color representation of the RAW data 25 is generally inserted after a color matrix process or after a conversion process from RGB to YUV signals. Whether to insert the 3D-LUT after either process or both processes depends on the information processing terminal 200. Furthermore, the 3D-LUT to be inserted differs depending on the information processing terminal 200, and the 3D-LUT needs to be generated for each information processing terminal 200 (although not necessary to generate from zero, it is necessary to adjust at least the 3D-LUT parameters).

Figure 3:
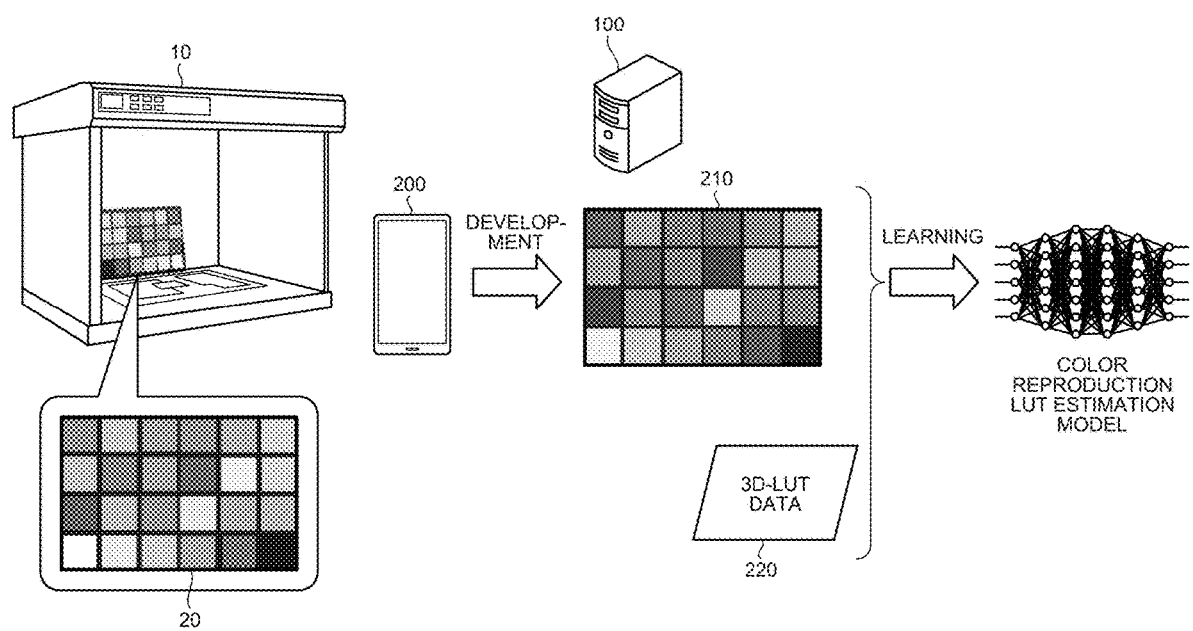
FIG. 3 is a diagram illustrating an example of learning of a color reproduction LUT estimation model according to the present embodiment.

Therefore, in the present embodiment, the 3D-LUT is estimated (generated) using the color reproduction LUT estimation model. Next, the learning phase of the color reproduction LUT estimation model will be described. FIG. 3 is a diagram illustrating an example of learning of the color reproduction LUT estimation model according to the present embodiment.

A standard light source device 10 has a booth shape, and is a device capable of unifying a light source environment by placing a subject in the device even when the subject is photographed in different places. As illustrated in FIG. 3, a color sample 20 is placed inside the standard light source device 10, and the color sample 20 is photographed by the information processing terminal 200. Then, the information processing apparatus 100 performs learning of the color reproduction LUT estimation model using a developed image 210 of the color sample 20 photographed by the information processing terminal 200 as the input data and the 3D-LUT (strictly speaking, 3D-LUT data 220 of 3D-LUT parameters and the like) used for developing the developed image 210 as the correct answer data. Specifically, for example, initial 3D-LUT parameter do not change any color of the developed image 210, and a development process is repeated on the captured image of the color sample 20 while changing the parameters according to a predetermined condition, thereby generating a large number of pieces of training data for repetitive learning of the color reproduction LUT estimation model.

Figure 4:
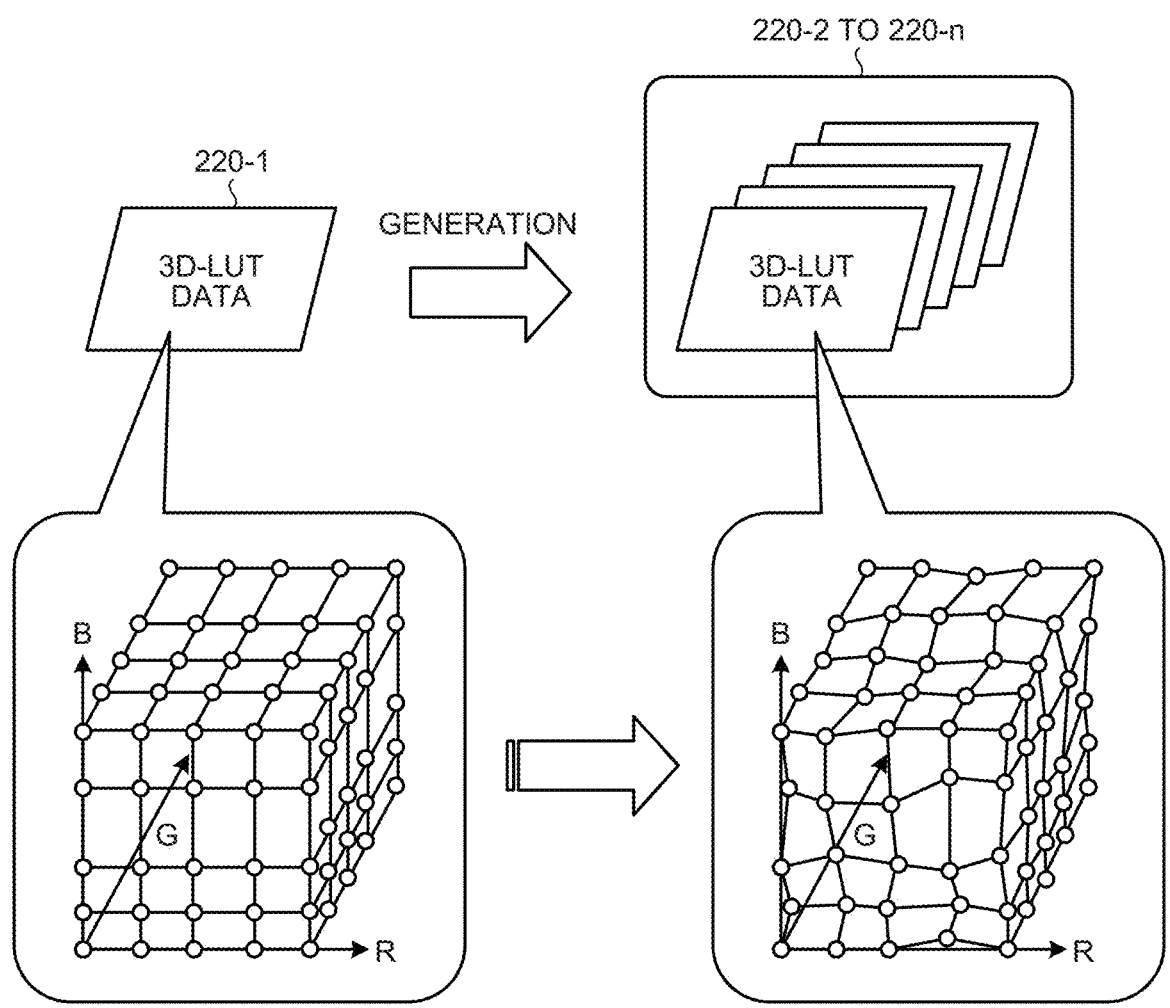
FIG. 4 is a diagram illustrating an example of changing 3D-LUT parameters according to the embodiment.

Next, the change of the 3D-LUT parameters for generating the training data will be described. FIG. 4 is a diagram illustrating an example of changing the 3D-LUT parameters according to the present embodiment. As illustrated in FIG. 4, a parameter of one piece of 3D-LUT data 220-1 is changed to generate a plurality of pieces of 3D-LUT data 220-2 to 220-$n$ ($n$ is any integer). Note that the parameter of the 3D-LUT data 220-1 is changed, for example, by randomly changing surrounding lattice points as illustrated in FIG. 4. Using each of the 3D-LUT data 220-2 to 220-$n$ generated in this manner, the color sample 20 photographed by the information processing terminal 200 is developed to acquire a plurality of developed images as the training data.

Figure 5:
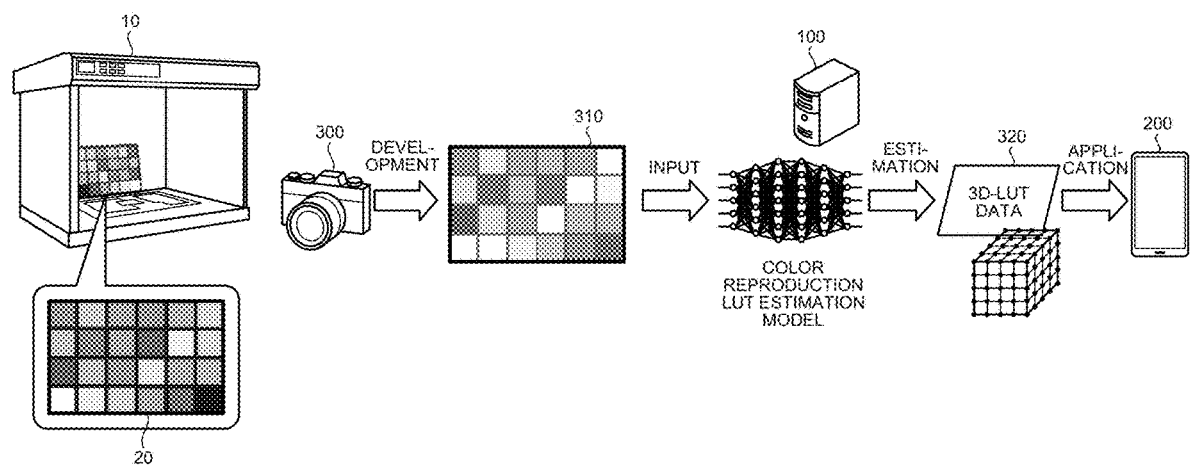
FIG. 5 is a diagram illustrating an example of estimating the 3D-LUT by a color reproduction LUT estimation model according to the embodiment.

Next, the estimation phase of the color reproduction LUT estimation model will be described. FIG. 5 is a diagram illustrating an example of estimating the 3D-LUT by the color reproduction LUT estimation model according to the present embodiment. The color reproduction LUT estimation model in FIG. 5 is the learning model described with reference to FIG. 3 and learning is performed by using the developed image 210 photographed and developed by the information processing terminal 200 as the input data and the 3D-LUT data 220 used for developing the developed image 210 as the correct answer data.

As illustrated in FIG. 5, the color sample 20 is placed inside the standard light source device 10, and the color sample 20 is photographed by a camera device 300. Next, the information processing apparatus 100 estimates the 3D-LUT (strictly speaking, 3D-LUT data 320) by inputting developed image 310 of the color sample 20 photographed by the camera device 300 to the color reproduction LUT estimation model.

The 3D-LUT data 320 estimated is a 3D-LUT (data) for reproducing, by the information processing terminal 200, the color of the developed image 310 photographed by the camera device 300. Therefore, by storing the 3D-LUT data 320 in the storage unit of the information processing terminal 200 and applying the 3D-LUT data 320, the color of the developed image 310 photographed and developed by the camera device 300 can be reproduced with the image photographed by the information processing terminal 200.

1.3. Functional Flow

Figure 6:
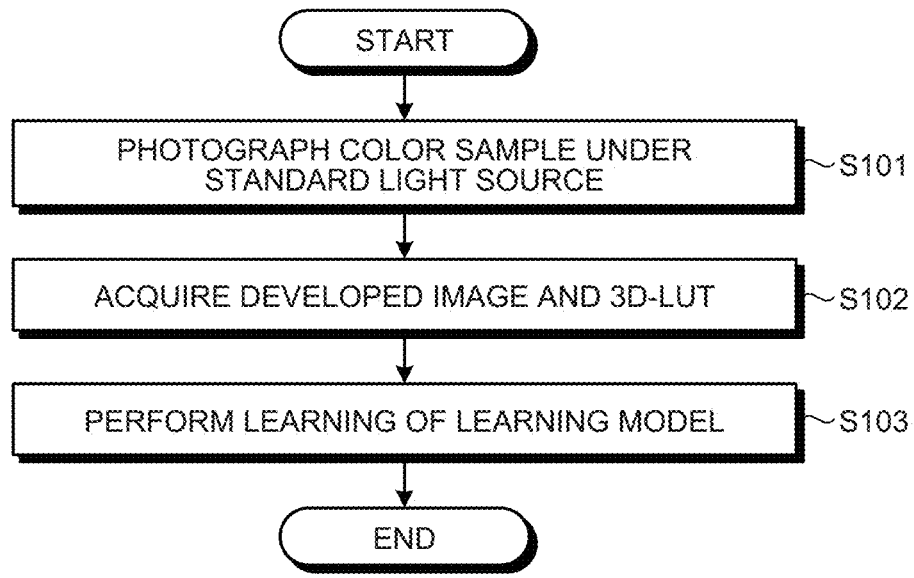
FIG. 6 is a flowchart illustrating a flow of a learning process of the color reproduction LUT estimation model according to the embodiment.

Next, a procedure for a learning process of the color reproduction LUT estimation model will be described with reference to FIG. 6. FIG. 6 is a flowchart illustrating a flow of the learning process of the color reproduction LUT estimation model according to the present embodiment.

As illustrated in FIG. 6, first, the color sample is photographed under the standard light source using a camera device for reproducing color representation of a different camera device (Step S101). A captured image photographed in Step S101 is transmitted to the information processing apparatus 100 via various communication networks such as the Internet, a communication cable, and the like.

Next, the acquisition unit 120 of the information processing apparatus 100 acquires the developed image photographed and developed in Step S101 and the 3D-LUT used for developing the developed image (Step S102).

Next, the learning unit 130 of the information processing apparatus 100 performs learning of the color reproduction LUT estimation model using the developed image acquired in Step S102 as the input data and the 3D-LUT as the correct answer data (Step S103). After Step S103, the process ends, but the generation unit 150 of the information processing apparatus 100 changes the 3D-LUT under the predetermined condition and executes Steps S101 to S103 using the changed 3D-LUT, thereby performing repetitive learning of the color reproduction LUT estimation model. As a result, by inputting the image of the color sample photographed and developed by the different camera device to the color reproduction LUT estimation model, it is possible to estimate the 3D-LUT for reproducing the color representation of the different camera device by the camera device used for learning.

Figure 7:
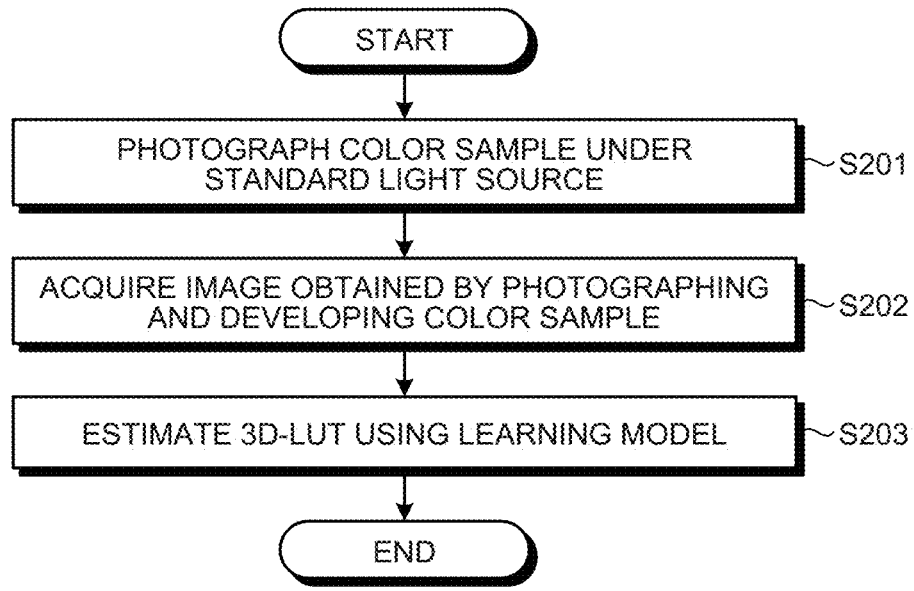
FIG. 7 is a flowchart illustrating a flow of a 3D-LUT estimation process by the color reproduction LUT estimation model according to the embodiment.

Next, a 3D-LUT estimation process by the color reproduction LUT estimation model will be described with reference to FIG. 7. FIG. 7 is a flowchart illustrating a flow of the 3D-LUT estimation process by the color reproduction LUT estimation model according to the present embodiment.

As illustrated in FIG. 7, first, the color sample is photographed under the standard light source using a different camera device for reproducing color representation with respect to the camera device used for learning of the color reproduction LUT estimation model (Step S201). A captured image photographed and developed in Step S201 is also transmitted to the information processing apparatus 100 via the Internet or the like.

Next, the acquisition unit 120 of the information processing apparatus 100 acquires the developed image photographed and developed in Step S201 (Step S202).

Next, the estimation unit 140 of the information processing apparatus 100 inputs the developed image acquired in Step S202 to the color reproduction LUT estimation model and estimates the 3D-LUT (Step S203). After Step S203, the process ends, but by storing the estimated 3D-LUT in the storage unit of the camera device used for learning the color reproduction LUT estimation model and applying the estimated 3D-LUT, it is possible to reproduce color representation of the different camera device used for photographing the image in Step S201.

2. Modification

2.1. First Modification

In addition, it is also possible to correct variations in color representation between camera devices by using the color reproduction LUT estimation model. When camera devices are mass-produced, color representation varies among models even in the same model due to variations in image sensors and the like. Therefore, a reference device serving as a reference is determined from mass-produced camera devices, and the color representation of other devices is adjusted to match the reference device, thereby correcting color representation variations in the same model.

Figure 8:
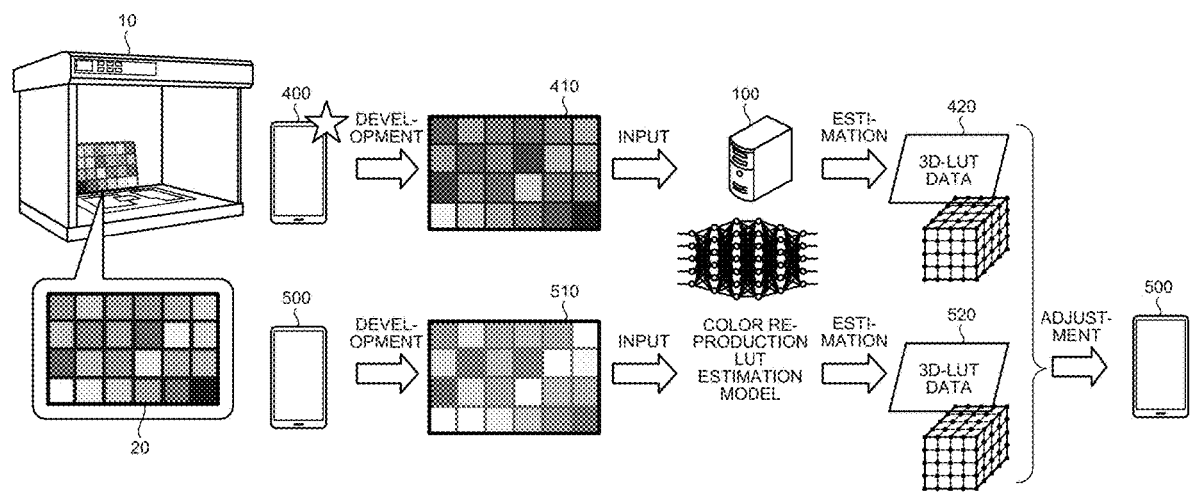
FIG. 8 is a diagram illustrating an example of correcting color representation variation in a same model using the color reproduction LUT estimation model according to the embodiment.

FIG. 8 is a diagram illustrating an example of correcting color representation variations in the same model using the color reproduction LUT estimation model according to the present embodiment. FIG. 8 illustrates an example of an adjusted camera device 500 adjusted to match the color representation of a reference camera device 400 serving as the reference. Here, the reference camera device 400 and the adjusted camera device 500 are the same model.

As illustrated in FIG. 8, the reference camera device 400 photographs the color sample 20 placed in the standard light source device 10. Then, a developed image 410 photographed and developed by the reference camera device 400 is input to the color reproduction LUT estimation model to estimate 3D-LUT data 420. Similarly, the adjusted camera device 500 photographs the color sample 20 placed in the standard light source device 10. Then, a developed image 510 photographed and developed is input to the color reproduction LUT estimation model to estimate 3D-LUT data 520.

Next, a differential 3D-LUT is generated by a difference in corresponding parameters of the estimated 3D-LUT data 420 and the 3D-LUT data 520. By storing the differential 3D-LUT in the storage unit of the adjusted camera device 500 and applying the differential 3D-LUT, the color representation of the adjusted camera device 500 can be adjusted to match the color representation of the reference camera device 400. By performing the above process on each of the mass-produced camera devices of the same model as the reference camera device 400, it is possible to correct variations in the color representation in the same model.

2.2. Second Modification

Figure 9:
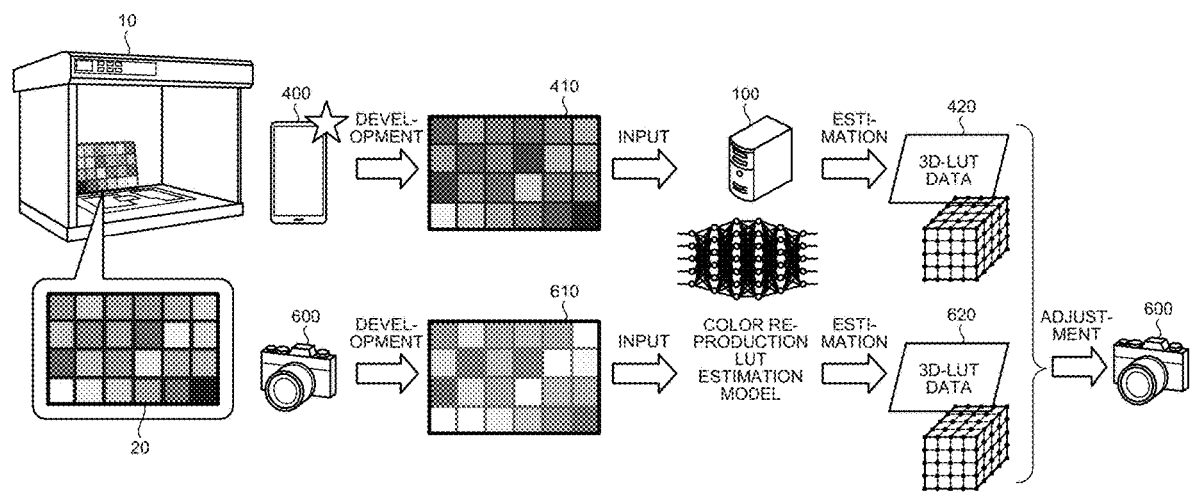
FIG. 9 is a diagram illustrating an example of color representation matching between different models using the color reproduction LUT estimation model according to the embodiment.

Still more, by performing the correction process described with reference to FIG. 8 on camera devices of different models, one camera device can reproduce color representation of a camera device of a different model. FIG. 9 is a diagram illustrating an example of color representation matching between different models using the color reproduction LUT estimation model according to the present embodiment. FIG. 9 illustrates an example of adjusting an adjusted camera device 600 to match the color representation of the reference camera device 400 serving as the reference. Here, the reference camera device 400 and the adjusted camera device 600 are different models.

In a process in FIG. 9, similarly to FIG. 8, each of the reference camera device 400 and the adjusted camera device 600 photographs the color sample 20 placed in the standard light source device 10, and developed images 410 and 610 photographed and developed are input to the color reproduction LUT estimation model to estimate 3D-LUT data 420 and 3D-LUT data 620.

Then, by generating a differential 3D-LUT between the 3D-LUT data 420 and the 3D-LUT data 620 estimated, storing the differential 3D-LUT in the storage unit of the adjusted camera device 600, and applying the differential 3D-LUT, the color representation of the adjusted camera device 600 can be adjusted to match the color representation of the reference camera device 400 of a different model.

3. Hardware Configuration Example

Figure 10:
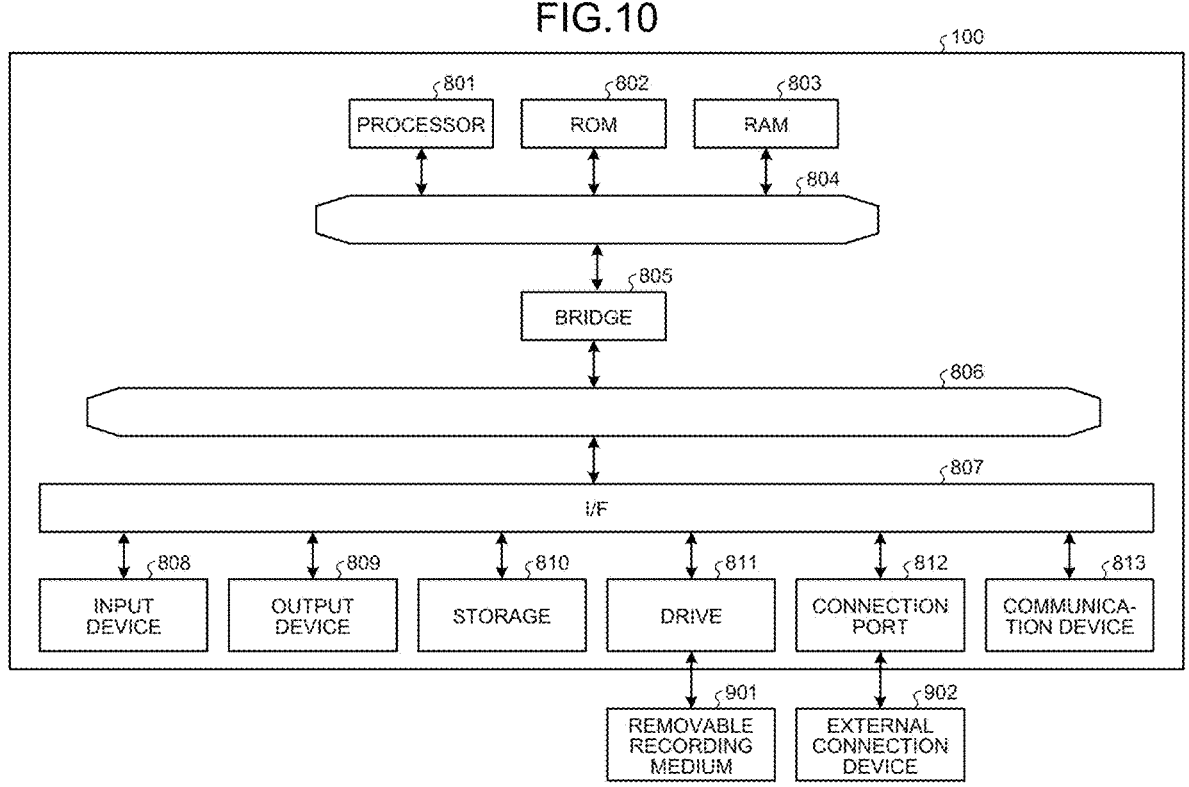
FIG. 10 is a block diagram illustrating a hardware configuration example of the information processing apparatus 100 according to the embodiment.

Next, a hardware configuration example of the information processing apparatus 100 according to the present embodiment will be described. FIG. 10 is a block diagram illustrating a hardware configuration example of the information processing apparatus 100 according to the present embodiment. As illustrated in FIG. 10, the information processing apparatus 100 includes, for example, a processor 801, a ROM 802, a RAM 803, a host bus 804, a bridge 805, an external bus 806, an interface 807, an input device 808, an output device 809, a storage 810, a drive 811, a connection port 812, and a communication device 813. Note that the hardware configuration illustrated here is an example, and some of the components may be omitted. In addition, components other than the components illustrated here may be further included.

(Processor 801)

The processor 801 functions as, for example, an arithmetic processor or a controller, and controls the overall operation of each component or a part thereof based on various programs recorded in the ROM 802, the RAM 803, the storage 810, or a removable recording medium 901.

(ROM 802 and RAM 803)

The ROM 802 is a unit that stores a program read by the processor 801, data used for calculation, and the like. The RAM 803 temporarily or permanently stores, for example, a program read by the processor 801, various parameters that appropriately change when the program is executed, and the like.

(Host Bus 804, Bridge 805, External Bus 806, and Interface 807)

The processor 801, the ROM 802, and the RAM 803 are mutually connected via, for example, the host bus 804 capable of high-speed data transmission. On the other hand, the host bus 804 is connected to the external bus 806 having a relatively low data transmission speed via, for example, the bridge 805. In addition, the external bus 806 is connected to various components via the interface 807.

(Input Device 808)

As the input device 808, for example, a mouse, a keyboard, a touch panel, a button, a switch, a lever, and the like are used. Furthermore, as the input device 808, a remote controller (hereinafter, remote control) capable of transmitting a control signal using infrared rays or other radio waves may be used. Furthermore, the input device 808 includes a voice input device such as a microphone.

(Output Device 809)

The output device 809 is a device capable of visually or audibly notifying a user of acquired information, including a display device such as a cathode ray tube (CRT), a liquid crystal display (LCD), or an organic electroluminescence light (EL), an audio output device such as a speaker or a headphone, a printer, a mobile phone, or a facsimile. Furthermore, the output device 809 according to the present embodiment includes various vibrating devices capable of outputting tactile stimulation.

(Storage 810)

The storage 810 is a device for storing various types of data. As the storage 810, for example, a magnetic storage device such as a hard disk drive (HDD), a semiconductor storage device, an optical storage device, or a magneto-optical storage device is used.

(Drive 811)

The drive 811 is, for example, a device that reads information recorded on the removable recording medium 901 such as a magnetic disk, an optical disk, a magneto-optical disk, or a semiconductor memory, or writes information to the removable recording medium 901.

(Connection Port 812)

The connection port 812 is a port for connecting an external connection device 902 such as a universal serial bus (USB) port, an IEEE 1394 port, a small computer system interface (SCSI), an RS-232 C port, or an optical audio terminal.

(Communication Device 813)

The communication device 813 is a communication device for connecting to a network, and is, for example, a communication card for wired or wireless LAN, Bluetooth (registered trademark), or wireless USB (WUSB), a router for optical communication, a router for asymmetric digital subscriber line (ADSL), a modem for various communications, or the like.

(Removable Recording Medium 901)

The removable recording medium 901 is, for example, a DVD medium, a Blu-ray (registered trademark) medium, an HD DVD medium, or various semiconductor storage media. It is obvious that the removable recording medium 901 may also be, for example, an IC card on which a non-contact IC chip is mounted or an electronic device.

(External Connection Device 902)

The external connection device 902 is, for example, a printer, a portable music player, a digital camera, a digital video camera, or an IC recorder.

Note that the storage unit 110 according to the present embodiment is realized by the ROM 802, the RAM 803, and the storage 810. Furthermore, the control unit 170 according to the present embodiment realized by the processor 801 reads and executes each control program for realizing the acquisition unit 120, the learning unit 130, the estimation unit 140, the generation unit 150, and the complementation unit 160 from the ROM 802, the RAM 803, and the like.

4. Summary

As described above, the information processing apparatus includes the acquisition unit that acquires the second image obtained by photographing the color sample by the second camera device and by developing, and the estimation unit that estimates a second 3D-LUT for reproducing the color of the color sample in the second image by the first camera device by inputting the second image to a model that has learned the first image obtained by photographing the color sample by the first camera device under the standard light source and by developing as the input data and the first 3D-LUT used for developing the first image as the correct answer data.

As a result, the 3D-LUT can be generated more easily.

Although the preferred embodiments of the present disclosure have been described in detail with reference to the accompanying drawings, the technical scope of the present disclosure is not limited to the embodiments. It is obvious that a person having ordinary knowledge in the technical field of the present disclosure can conceive various changes or modifications within the scope of the technical idea described in the claims, and it is naturally understood that these also belong to the technical scope of the present disclosure.

Furthermore, the effects described in the present specification are merely illustrative or exemplary, and are not restrictive. In other words, the technology according to the present disclosure can exhibit other effects obvious to those skilled in the art from the description of the present specification in addition to or instead of the above effects.

Note that the present technology can also have the following configurations.

REFERENCE SIGNS LIST

10 Standard Light Source Device
20 Color Sample
25 Raw Data
30 Developed Image Data
100 Information Processing Apparatus
110 Storage Unit
120 Acquisition Unit
130 Learning Unit
140 Estimation Unit
150 Generation Unit
160 Complementation Unit
170 Control Unit
200 Information Processing Terminal
210, 310, 410, 510, 610 Developed Image
220, 320, 420, 520, 620 3D-LUT Data
300 Camera Device
400 Reference Camera Device
500 Adjusted Camera Device
600 Adjusted Camera Device

The invention claimed is:

1. An information processing apparatus, comprising:
an acquisition unit configured to acquire a first image and a first 3D lookup table (3D-LUT), wherein the first image is obtained by a first camera device that photographs and develops a color sample under a standard light source based on the first 3D-LUT; and
a learning unit configured to learn a model to generate a second 3D-LUT to reproduce, by the first camera device, a color of the color sample in a second image, wherein
the second image is obtained by a second camera device that photographs and develops the color sample, and
in the model, the first image corresponds to input data and the first 3D-LUT corresponds to correct answer data.

2. The information processing apparatus according to claim 1, wherein the first image corresponds to a plurality of images photographed and developed while a parameter of the first 3D-LUT is changed.

3. The information processing apparatus according to claim 1, wherein each of the first 3D-LUT and the second 3D-LUT is one of an RGB-LUT or a YCbCr-LUT.

4. The information processing apparatus according to claim 1, wherein the color sample is one of a color chart or a grayscale chart.

5. An information processing apparatus, comprising:
an acquisition unit configured to acquire a second image, wherein the second image is obtained by a second camera device that photographs and develops a color sample; and
an estimation unit configured to:
input the second image to learn, based on a first image, a model, wherein
the first image is obtained by a first camera device that photographs and develops the color sample under a standard light source, and
the first image corresponds to input data and a first 3D lookup table (3D-LUT) corresponds to correct answer data; and
estimate a second 3D-LUT to reproduce, by the first camera device, a color of the color sample in the second image.

6. The information processing apparatus according to claim 5, wherein the color sample is one of a color chart or a grayscale chart.

7. The information processing apparatus according to claim 5, wherein each of the first 3D-LUT and the second 3D-LUT is one of an RGB-LUT or a YCbCr-LUT.

8. The information processing apparatus according to claim 5, further comprising:
a generation unit configured to generate, based on a difference between the second 3D-LUT and a third 3D-LUT, a differential 3D-LUT for the second camera device in order to match a color representation of the second camera device to a color representation of a third camera device, wherein
the acquisition unit is further configured to acquire a third image obtained by the third camera device that photographs and develops the color sample, and
the estimation unit is further configured to estimate, based on input of the third image to the model, the third 3D-LUT to reproduce, by the first camera device, a color of the color sample in the third image.

9. The information processing apparatus according to claim 8, wherein a type of the second camera device is same or different from a type of the third camera device.

10. An information processing terminal, comprising a storage unit configured to store the estimated second 3D-LUT according to claim 5.

11. The information processing terminal according to claim 10, further comprising a complementation unit configured to complement, based on a quantity of a first parameter of the second 3D-LUT being smaller than a number of display colors of the information processing terminal, a second parameter with the first parameter to reproduce a color that cannot be reproduced by the second 3D-LUT.

12. A method, comprising:
in an information processing apparatus:
acquiring a first image and a first 3D lookup table (3D-LUT), wherein the first image is obtained by a first camera device that photographs and develops a color sample under a standard light source based on the first 3D-LUT; and
learning a model for generating a second 3D-LUT to reproduce, by the first camera device, a color of the color sample in a second image, wherein
the second image is obtained by a second camera device that photographs and develops the color sample, and
in the model, the first image corresponds to input data and the first 3D-LUT corresponds to correct answer data.

13. A method, comprising:
in an information processing apparatus:

acquiring a second image, wherein the second image is obtained by a second camera device that photographs and develops a color sample;
inputting the second image to learn, based on a first image, a model, wherein
the first image is obtained by a first camera device that photographs and develops the color sample under a standard light source, and
the first image corresponds to input data and a first 3D lookup table (3D-LUT) corresponds to correct answer data; and
estimating a second 3D-LUT for reproducing, by the first camera device, a color of the color sample in the second image.

14. A non-transitory computer-readable medium having stored thereon, computer-executable instructions which, when executed by a computer, cause the computer to execute operations, the operations comprising:
acquiring a first image and a first 3D lookup table (3D-LUT), wherein the first image is obtained by a first camera device that photographs and develops a color sample under a standard light source based on the first 3D-LUT; and
learning a model for generating a second 3D-LUT to reproduce, by the first camera device, a color of the color sample in a second image, wherein
the second image is obtained by a second camera device that photographs and develops, and
in the model, the first image corresponds to input data and the first 3D-LUT corresponds to correct answer data.

15. A non-transitory computer-readable medium having stored thereon, computer-executable instructions which, when executed by a computer, cause the computer to execute operations, the operations comprising:
acquiring a second image, wherein the second image is obtained by a second camera device that photographs and develops a color sample;
inputting the second image to learn, based on a first image, a model, wherein
the first image is obtained by a first camera device that photographs and develops the color sample under a standard light source, and
the first image corresponds to input data and a first 3D lookup table (3D-LUT) corresponds to correct answer data; and
estimating a second 3D-LUT for reproducing, by the first camera device, a color of the color sample in the second image.

16. A model, comprising:
an input layer configured to receive a second image as an input, wherein the second image is obtained by a second camera that photographs and develops a color sample, wherein
in the model, a first image corresponds to input data and a first 3D lookup table (3D-LUT) corresponds to correct answer data,
the first image is obtained by a first camera device that photographs and develops the color sample under a standard light source based on the first 3D-LUT;
an output layer configured to output a second 3D-LUT to reproduce, by the first camera device, a color of the color sample in the second image;
a first element that belongs to one of the input layer or a specific layer different from the output layer; and
a second element, wherein
a value of the second element is based on the first element and a weight of the first element, and
the model is configured to control, by an operation based on the first element and the weight of first element, an information processing apparatus to output the second 3D-LUT from the output layer.

* * * * *